United States Patent
Hunkeler et al.

(10) Patent No.: US 11,038,767 B2
(45) Date of Patent: Jun. 15, 2021

(54) DISCOVERY OF A SET OF NODES IN A NETWORK

(71) Applicant: International Business Machines Corporation, Armonk, NY (US)

(72) Inventors: Urs Hunkeler, Echandens (CH); Clemens Lombriser, Thalwil (CH); Hong Linh Truong, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/594,749

(22) Filed: Oct. 7, 2019

(65) Prior Publication Data

US 2020/0044935 A1 Feb. 6, 2020

Related U.S. Application Data

(63) Continuation of application No. 15/891,719, filed on Feb. 8, 2018, now Pat. No. 10,523,515, which is a (Continued)

(30) Foreign Application Priority Data

Mar. 30, 2011 (EP) .................................. 11160373

(51) Int. Cl.
*H04L 12/24* (2006.01)
*H04L 12/721* (2013.01)
*H04W 40/24* (2009.01)

(52) U.S. Cl.
CPC .............. *H04L 41/12* (2013.01); *H04L 45/34* (2013.01); *H04W 40/246* (2013.01)

(58) Field of Classification Search
CPC ......... H04L 41/12; H04L 45/34; H04L 12/24; H04L 12/721; H04W 40/246;
(Continued)

(56) References Cited

U.S. PATENT DOCUMENTS 7,133,368 B2 * 11/2006 Zhang ............... H04L 29/12509
370/249
7,502,360 B2 * 3/2009 Liu ....................... H04W 40/24
370/347
(Continued)

FOREIGN PATENT DOCUMENTS

CN 101207537 A 6/2008
CN 101267433 A 9/2008
(Continued)

OTHER PUBLICATIONS

Wu et al., "Iterative Local Solutions for Connected Dominating Sets in Ad Hoc Wireless Networks", IEEE Transactions on Computers, vol. 57, No. 5, May 2008, pp. 703-715.
(Continued)

*Primary Examiner* — Man U Phan
(74) *Attorney, Agent, or Firm* — Scully, Scott, Murphy & Presser, PC; Daniel P. Morris, Esq.

(57) ABSTRACT

Methods and systems for discovery of a set of nodes in a network. The method includes selecting a node amongst nodes in a group of nodes to be processed, implementing a discovery procedure for the selected node, including broadcasting a neighbor discovery request from a node currently selected on a shared transmission medium of the network, receiving at the node currently selected replies sent by neighbor nodes on the shared transmission medium and adding the neighbor nodes to the group of nodes to be processed and repeating the steps of selecting and instructing for other nodes in the group of nodes to be processed, until all nodes of the set are discovered. Implementing a link probing procedure after the discovery procedure, including sending one or more link probing messages for a measure of link quality and receiving replies comprising data related to the measure of link quality.

20 Claims, 6 Drawing Sheets

Related U.S. Application Data continuation of application No. 15/191,832, filed on Jun. 24, 2016, now Pat. No. 10,027,552, which is a continuation of application No. 14/008,956, filed as application No. PCT/IB2012/051145 on Mar. 12, 2012, now Pat. No. 9,414,296.

(58) Field of Classification Search
CPC ..... H04W 24/00; H04W 92/18; H04W 52/48; H04W 52/50; H04W 52/38; H04W 76/10; H04W 52/383; H04W 40/24; G06F 15/173; G06F 15/16
USPC ........................................................ 370/328
See application file for complete search history.

(56) References Cited

U.S. PATENT DOCUMENTS

| | | | |
|---|---|---|---|
| 7,706,337 B2 | 4/2010 | Pandey et al. | |
| 7,738,413 B2* | 6/2010 | Varaiya | H04W 40/22 370/321 |
| 7,911,978 B1* | 3/2011 | Chandra | H04W 40/246 370/255 |
| 8,175,005 B2* | 5/2012 | Okmyanskiy | H04L 41/12 370/254 |
| 8,289,190 B2* | 10/2012 | Lim | G08G 1/042 340/938 |
| 8,392,541 B2* | 3/2013 | Agarwal | H04W 40/32 709/220 |
| 8,515,433 B2* | 8/2013 | Vaswani | H04L 47/10 455/445 |
| 8,774,050 B2* | 7/2014 | Vasseur | H04W 40/10 370/254 |
| 8,799,438 B2* | 8/2014 | Chen | H04L 41/12 709/223 |
| 8,964,741 B2* | 2/2015 | Retana | H04L 45/02 370/390 |
| 9,414,296 B2 | 8/2016 | Hunkeler et al. | |
| 9,445,355 B2 | 9/2016 | Sun | |
| 9,813,920 B2 | 11/2017 | Abraham et al. | |
| 10,027,552 B2 | 7/2018 | Hunkeler et al. | |
| 2006/0168343 A1 | 7/2006 | Ma et al. | |
| 2011/0019582 A1 | 1/2011 | Okmyanskiy et al. | |
| 2012/0166610 A1 | 6/2012 | Doh et al. | |
| 2012/0320790 A1 | 12/2012 | Shaffer et al. | |
| 2014/0078935 A1 | 3/2014 | Sun | |
| 2018/0167284 A1 | 6/2018 | Hunkeler et al. | |

FOREIGN PATENT DOCUMENTS

| | | |
|---|---|---|
| CN | 101321095 A | 12/2008 |
| CN | 101431684 A | 5/2009 |
| CN | 101431784 A | 5/2009 |
| CN | 101437293 A | 5/2009 |
| JP | 2000-261360 A | 9/2000 |
| JP | 2006-237854 A | 9/2006 |

OTHER PUBLICATIONS

Deb et al., "A topology discovery algorithm for sensor networks with applications to network management", in Proceedings of the IEEE CAS Workshop on Wireless Communications and Networking, Pasadena, USA, Sep. 2002.

Deb et al., "Multi-Resolution State Retrieval in Sensor Networks", 2003 IEEE International Workshop on Sensor Network Protocols and Applications, 3003 Proceedings of the First IEEE, May 11, 2003, pp. 19-29.

UK Examination Report dated Nov. 20, 2014, issued in UK Application No. GB1316093.2.

Ergen et al., "PEDAMACS: Power Efficient and Delay Aware Medium Access Protocol for Sensor Networks", IEEE Transactions on Mobile Computing, vol. 5, No. 7, Jul. 2006, pp. 920-930.

Pister et al., "TSMP: Time Synchronized Mesh Protocol", Proceedings of the IASTED International Symposium, Distributed Sensor Networks (DSN 2008), Nov. 16-18, 2008, Orlando, Florida, USA, pp. 391-398.

Chandra et al., "Adaptive Topology Discovery in Hybrid Wireless Networks", web presentation of lecture given at the Fields Institute, Sep. 20, 2002, "Adhoc-Now" Conference on Ad-Hoc Networks and Wireless; pp. 1-14.

International Search Report PCT/IB2012/051145.

Office Action dated May 6, 2015 from related U.S. Appl. No. 14/008,956.

Office Action dated Oct. 13, 2015 from related U.S. Appl. No. 14/008,956.

Notice of Allowance dated Feb. 1, 2016 from related U.S. Appl. No. 14/008,956.

Notice of Allowance dated Apr. 29, 2016 from related U.S. Appl. No. 14/008,956.

Office Action dated Oct. 23, 2017 from related U.S. Appl. No. 15/191,832.

Office Action dated Apr. 11, 2019 from related U.S. Appl. No. 15/891,719.

Notice of Allowance dated Aug. 19, 2019 from related U.S. Appl. No. 15/891,719.

List of IBM Patents or Patent Applications Treated as Related dated Oct. 7, 2019, pp. 1-2.

Official Action dated Jan. 26, 2018 received from the Canadian Patent Office in related application 2,824,268.

* cited by examiner

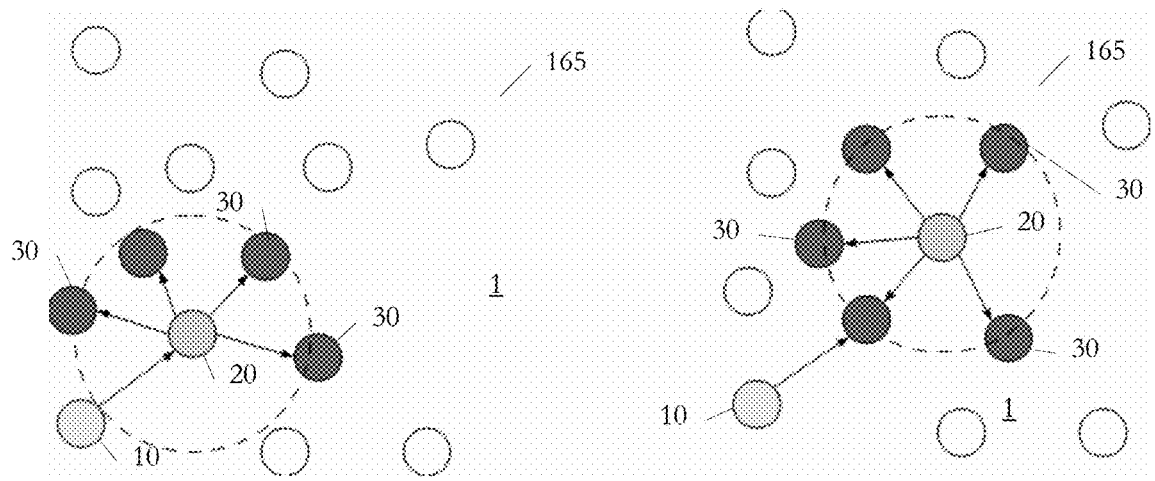
FIG. 1   FIG. 2
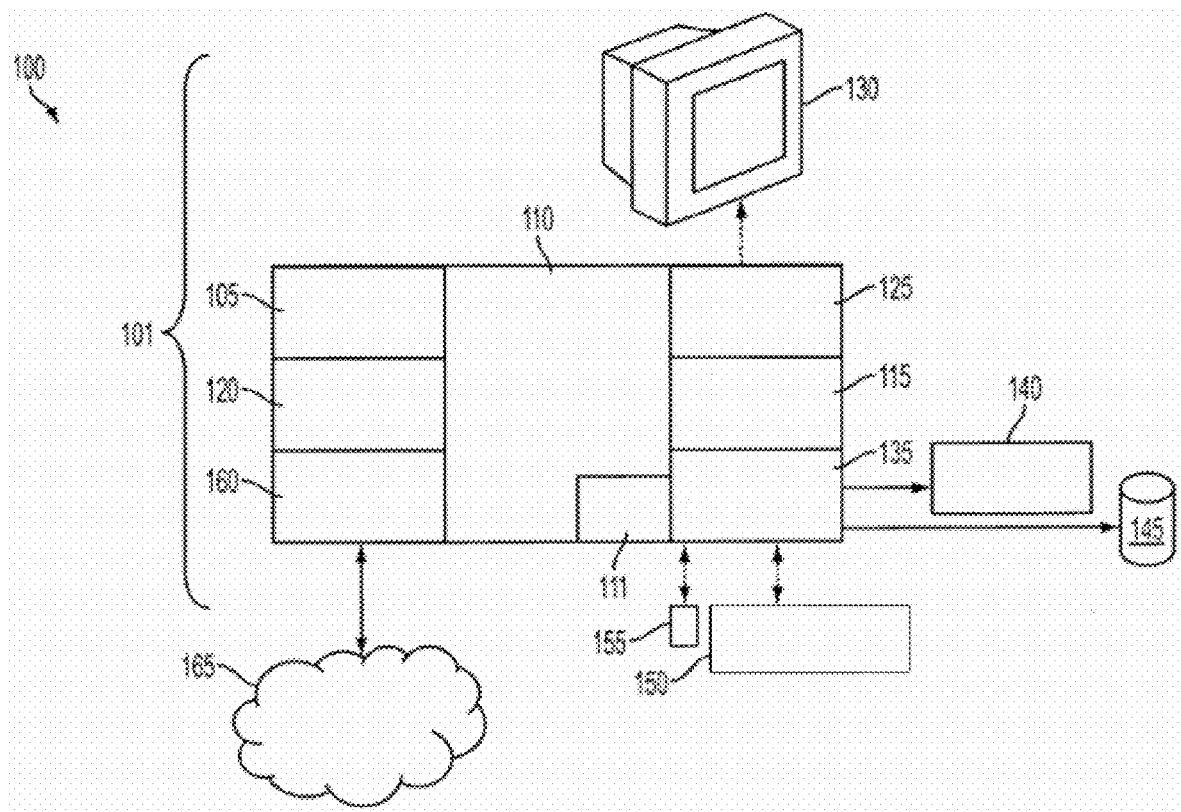
FIG. 3

DISCOVERY OF A SET OF NODES IN A NETWORK

FIELD OF THE INVENTION

The present invention broadly relates to computerized methods and systems for allowing for discovery of a set of nodes in a network, and particularly to topology discovery procedures for centralized wireless sensor network architectures.

BACKGROUND OF THE INVENTION

Many-to-one communication is a common requirement of network applications such as sensor network applications, e.g. in the field of environmental monitoring or data gathering. Sensor nodes (SNs) essentially exchange information with a base station (BS) and seldom between themselves. The SNs generate periodic data samples and send them, possibly using other SNs to forward messages, to the BS for further processing.

Compared to the SNs, the BS is in general equipped with a more powerful processing unit and also more memory for programs and data. A centralized network architecture is most appropriate for such environment because it can exploit the resources available in the BS to perform complex routing functions, thus keeping the sensor nodes as simple as possible.

To be able to compute the required routing information the BS needs to know the complete topology of the network, i.e., all the SNs that are deployed and the quality of the wireless links between those nodes.

In case of a rather static network topology the BS could be manually configured with the topology information, but this method is error-prone and becomes impractical when the number of wireless SNs are large.

Most sensor networks have a distributed architecture in which the sensor nodes build up a local topology database by exchanging information with neighboring nodes. In such distributed architectures, there is no need for knowing the "global" topology.

The so-called PEDAMACS architecture [1] is a centralized sensor network architecture that requires for its operation an automatic topology discovery. The PEDAMACS's topology discovery comprises two phases: the topology learning and the topology collection phases. The BS starts the learning phase by broadcasting a coordination message which is assumed to be received by all nodes in the network. Following the coordination message the BS floods the network with a tree construction message, which is re-broadcasted by the SNs. A node uses the tree construction messages it receives from its neighbors to build its local topology information (i.e., its neighboring nodes and the quality of the links to these nodes) and to select the node (its parent node) it will use in case it wants to send a message to the BS.

After the topology learning phase, the BS starts the topology collection phase, also by broadcasting a coordination message, which is again assumed to be received by all nodes in the network. When a node receives the second coordination message, it transmits the local topology it has collected in the phase before to its parent for subsequent forwarding to the BS.

In both phases, the nodes have no coordination between each other yet and use carrier sense multiple access (CSMA) to cope with possible transmission collisions.

TSMP [2] is another centralized sensor network architecture. It is TDMA-based and reserves a time slot for a periodic neighbor discovery process. During this time slot, nodes exchange discovery messages randomly for the purpose of link probing. The results are reported by means of a periodic health report.

Chandra et al. [3] discloses an adaptive topology discovery in hybrid wireless networks wherein the network discovery procedure is close to that of PEDAMACS. Namely, the procedure consists of flooding (broadcasting) discovery messages into the network. Interestingly, the reception of the broadcasted messages is ascertained by having the sender retransmitting them until an acknowledgement is received. This solution increases the total number of transmitted messages and with it the intensity of the broadcast needs.

The following references, as cited above, are thus part of the background art for the present invention:

[1] S. C. Ergen, P. Varaija, "PEDAMACS: Power Efficient and Delay Aware Medium Access Protocol for Sensor Networks", IEEE Trans on Mobile Computing, vol. 5, no 7, July 2006;

[2] K. Pister, L. Doherty, "TSMP: Time Synchronized Mesh Protocol", Proc LASTED Int. Symposium Distributed Sensor Networks (DSN 2008), Nov. 16-18, 2008, Orlando, Fla., USA; and

[3] R. Chandra, C. Fetzer, K. Hogstedt; "Adaptive Topology Discovery in Hybrid Wireless Networks"; Informatics '02.

BRIEF SUMMARY OF THE INVENTION

According to one embodiment, the present invention is embodied as a method of discovery of a set of nodes in a network, including (a) selecting from a source computer node a computer node amongst a group of computer nodes on the computer network; and (b) implementing, from the source computer node, a discovery procedure for the selected computer node. The discovery procedure includes (c) broadcasting a neighbor discovery request from a computer node currently selected on a shared transmission medium of the computer network; (d) receiving, at the computer node currently selected, replies sent by neighbor computer nodes on the shared transmission medium and adding said neighbor computer nodes to a set of discovered computer nodes; and (e) repeating steps (a) and (b) for other selected computer nodes in the group of computer nodes to be processed until the discovery procedure for all the computer nodes of the group of computer nodes has been implemented, such that the set of discovered computer nodes includes all the neighbor computer nodes that sent replies. The method further includes (f) after the discovery procedure for all the computer nodes of the group of computer nodes has been implemented, implementing a link probing procedure for each computer node of the group of computer nodes and for each computer node of the set of discovered computer nodes, said link probing procedure including sending one or more link probing messages for a measure of link quality and receiving replies comprising data related to the measure of link quality.

According to another aspect, the invention is embodied as a computer program residing on a computer-readable medium, comprising instructions for causing nodes of a computer network to implement each of the steps of the method according to embodiments of the invention.

According to another aspect, the invention is embodied as a computer network comprising nodes, preferably sensor nodes, each with at least one processor operatively interconnected to a memory, whereby the computerized network is configured to implement each of the steps of the method according to embodiments of the invention.

Networks, methods and computer program functions embodying the present invention will now be described, by way of non-limiting examples, and in reference to the accompanying drawings.

BRIEF DESCRIPTION OF SEVERAL VIEWS OF THE DRAWINGS

FIGS. 1 and 2 schematically illustrate networks nodes at different steps of a network discovery procedure, according to embodiments;

FIG. 3 schematically depicts an example of a computerized unit (e.g., a base station or sensor node) suitable for implementing steps of methods according to embodiments of the invention;

DETAILED DESCRIPTION OF THE INVENTION

Figure 4:
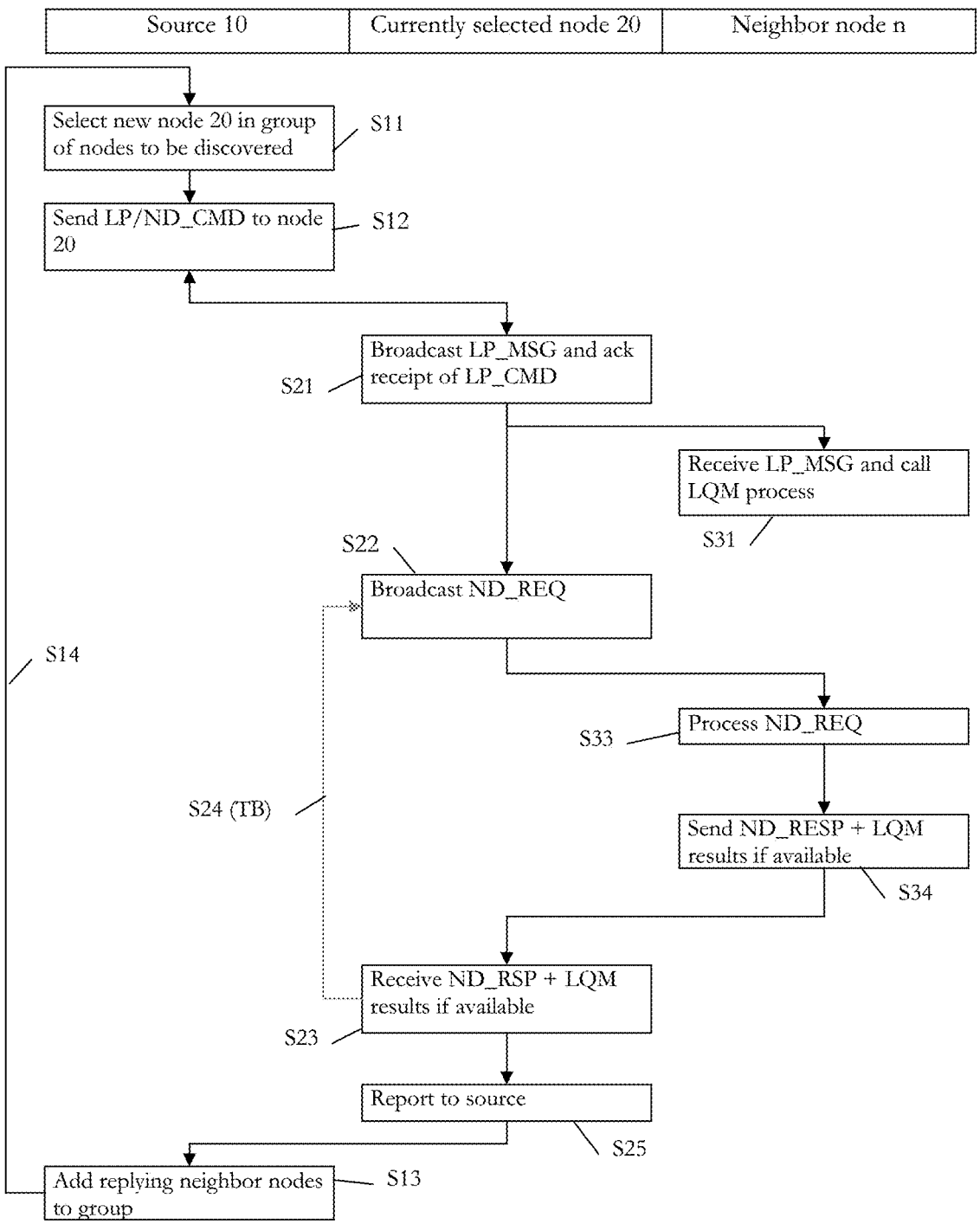
FIG. 4 is a flowchart showing high-level steps of a network discovery procedure, interlaced with a link probing procedure, according to embodiments.

First, general aspects of methods according to embodiments of the invention are discussed, together with high-level variants thereof (section 1). Next, in section 2, more specific embodiments are described.

1. General Aspects of the Invention

In reference to FIGS. 1-10, present methods are implemented in a computerized network 165 comprising nodes 20, 30, which use a shared transmission medium 1 (e.g., wireless) for communicating. Preferably, the network is a wireless sensor network, as discussed through examples below.

Typically, a centralized network architecture is assumed, with the centered on a source node 10, hereafter called base station (BS). Such an environment exploits resources available in the BS to perform important tasks such as the routing functions, keeping the node functions as simple as possible.

In the following, iterative procedures are described that allow for an automatic discovery of the nodes. As shown in FIGS. 1 and 2, reference 20 denotes a node "currently" selected; reference numerals 30 denotes neighbor nodes. The node currently selected changes through iterative procedures to be discussed below. The quality of bidirectional links between the nodes can be explored concomitantly or subsequently.

Such procedures allow for discovering nodes that are several hops away from a source node; they further permit short and deterministic run times. Further, few or no state information at all needs to be maintained by the nodes between operations.

1.1. General Embodiment of the Method

The following steps are implemented (emphasis put on FIGS. 1, 2, 4 and 5), as seen from the viewpoint of a monitoring entity, e.g., the BS:

Step S11: a node 20 is first selected amongst nodes tagged as "to be processed", meaning that implementation of a network discovery (ND) procedure has to be performed for said nodes. The group (e.g., a list) of nodes tagged as 'to be processed' is typically maintained at the BS. At the first iteration, the BS selects itself as a node 'to be processed';

Step S12: the selected node 20 is instructed to implement a ND procedure. The ND procedure comprises:

Step S22: broadcasting a ND request (i.e., from the node 20 currently selected) on the shared transmission medium 1; and Step S23: receiving (i.e., at the node 20 currently selected) replies sent by neighbor nodes 30 on the shared transmission medium, in response to the ND request, see step S34. The replying nodes are thereby identified as potential nodes to be processed. They are accordingly added to the group of nodes 'to be processed', e.g., by the node 20 currently selected or the BS. Obviously, if said nodes have already been processed, they do not need to be added to (or retained in) the group. For example, node 20 reports to the BS all the nodes which have replied and the BS determines which nodes still need to be processed. As the procedure likely results in identifying nodes multiple times, the BS preferably maintains a group free of duplicates.

Finally, step S14: the above steps are repeated for other nodes 30 which are tagged as 'to be processed', until all relevant nodes are discovered, i.e., implementing the ND procedure anew for any node in the group leaves the group unchanged.

As evoked earlier, the discovery procedure is implemented at one node at a time, i.e., at least the broadcasting step occurs at one node at a time only. The collision risk is accordingly lowered.

1.2. High-Level Variants

The iteration is typically controlled from the base station. Before selecting another candidate node for implementing a new ND procedure, the BS waits that a currently selected node completes (at least) the broadcasting step, as described above. The currently selected node may for instance reports to the BS upon completion of the broadcasting step at the earliest, such as to avoid broadcasting overlap.

Now, in (non-preferred) implementations, other steps of the ND procedure may be chosen to overlap, e.g., the $n^{th}$ discovered node (node n) receives replies from node n+2 while node n+1 wad already instructed to broadcast ND requests. Such variants may accelerate the ND procedure.

Preferably yet, the new ND procedure is triggered after the node 20 currently selected has received the replies from the neighbor nodes, to further minimize the use of the shared transmission medium. Thus, the new ND is typically started upon reception of a report from the currently selected node, the report attesting to reception of at least one reply from a neighbor node. As we shall see specific procedures are preferred, which lead to only one report sent from a current node, upon completion of a ND procedure (all replies assumed to be received).

How to reach a node is preferably achieved thanks to a source routing mechanism. Source routing is known per se. Applying this mechanism to the present context allows the BS to send ND commands to a given node. The source route information for a given node is built step-by-step based on the source route information of a node which has previously detected said given node. For example, if node A is a neighbor detected by the BS itself, a source route from the BS to node A can be noted "BS-A"; if furthermore node B is a neighbor of A, then a source route from the BS to B will be "BS-A-B" and so on. The resulting source routes are not only used by the BS to send requests but also by the nodes to report to the BS (by using reverse source routes). With a source routing mechanism the BS and the nodes can exchange messages directly with each other, without requiring flooding/broadcasting mechanisms. And since the BS instructs nodes to implement the ND procedure one after the other, collisions are prevented. The nodes do accordingly not need to use CSMA when sending their replies to the BS.

Used together with the iterative procedure described above, the source routing mechanism allows for reaching distant nodes, be it indirectly, such that even the nodes beyond a direct broadcast length (single hop) can be reached. Thus, present methods apply to geographically extended networks, it being unimportant that messages broadcasted by the BS can be directly received by all nodes in the network.

Next, a link probing (LP) procedure shall preferably be performed, in addition to the ND procedure. The LP procedure aims at evaluating the link quality between nodes identified during the ND procedure. The LP procedure otherwise resembles the ND procedure: it is an iterative process typically controlled from the BS.

Figure 5:
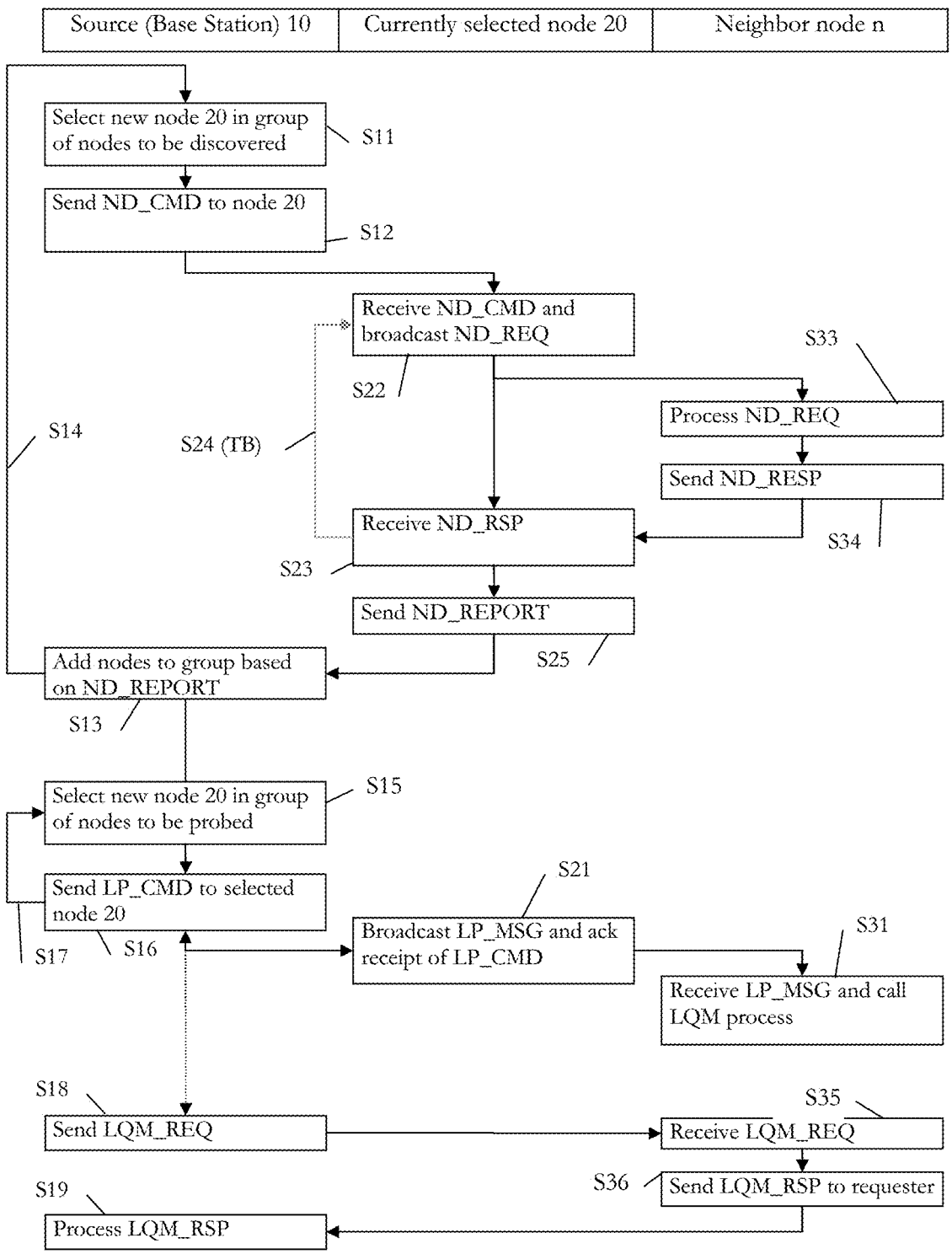
FIG. 5 shows another flowchart of typical, high-level steps as implemented in alternate embodiments, wherein the discovery procedure is performed before the link probing procedure.

The LP procedure can be intertwined with the ND procedure, as illustrated in FIG. 4. Yet, several schedule possibilities, i.e., when to start the LP procedure, can be contemplated. For example, the LP procedure may be implemented at a current node 20 after completion of the ND procedure for at least said current node. In preferred variants, the LP procedure starts once all nodes have been discovered, as illustrated in FIG. 5. This last scenario is more deterministic: the time necessary to complete the ND procedure (shorter) is easily determined and not perturbed by intertwined LP procedures.

To start the LP procedure, the BS instructs (FIG. 4, step S12 or FIG. 5, step S16) a node 20 currently selected to implement a LP procedure. The LP procedure as such typically starts by "sending" one or more LP messages to nodes 30 neighboring the selected node 20, step S21, for subsequent measure of link quality (step S31).

There, two variants can be contemplated, i.e., "sending" may refer to a link method or a broadcast method:

Link Method:

In this method all relevant links are probed individually. The BS sends to a given node 20 (out of the list of discovered nodes) a request for probing the link from a given neighbor n (i.e., one node amongst node 30). Upon reception of this request, node 20 asks node n to send a number of messages to it. Node 20 listens for the messages burst sent by node n, counts the number of messages it could receive error-free, measures the received signal strength indicator (RSSI, i.e., a measurement of the power present in a received radio signal) and/or other indicators, etc., and reports the results back to the BS. The link probing procedure for node 20 is terminated when the BS has asked all nodes to probe all adjoining links.

Broadcast Method:

In this approach, upon receiving the link probing request sent by the BS, a selected node 20 broadcasts a number of messages. Neighbor nodes 30 that can receive the broadcasts count the number of messages they could receive error-free, measure the resulting RSSI, etc.

Next, there are at least two options on how the results could be transferred to the BS, namely node 20 asks each neighbor 30 individually and sends the results to the base station, or the base station requests the results directly from the neighboring nodes.

Another option will be discussed later in reference to FIG. 4.

Broadcasting the LP messages on the shared transmission medium 1, just like in the ND procedure, remains an efficient approach inasmuch as one node at a time (node 20) is selected. For instance, for a network with N nodes, the broadcast method requires only O(N) measurements while the link method requires $O(N^2)$ measurements. The run time of the broadcast method is therefore significantly shorter. Note also that in both the link and broadcast methods nodes are not transmitting concurrently and therefore no CSMA-like approach is required.

Now, the replies send by neighbor nodes when implementing a ND and/or LP procedure are preferably unicasted, step S34, for efficiency. Successful reception of the reply message could be acknowledged, e.g. using the link acknowledgement mechanism of the 802.15.4 MAC layer.

Since multiple nodes may reply concurrently, here the replying nodes may use a CSMA-like protocol to deal with possible collisions, whereby a reply is sent in absence of other traffic on the shared medium 1, as known per se. This will be further discussed in reference to FIG. 7.

Also, replies received at a node 20 currently selected are preferably taken in consideration during a limited time only (a timer TB is triggered beforehand), making the procedure more deterministic. Typically, the step of broadcasting a ND request is repeated a few times, with the ND request comprising information as to whether a neighbor node should reply or not. Only nodes that either did not succeed to transmit their reply in the round before, e.g., due to the time limit; or were not aware of the round before, answer to a new request, using the same procedure as for the first round. This will reduce the number of answering nodes and thus increase their chance for a successful reply. The whole procedure remains deterministic.

Depending on the nodes density, various discovery rounds may be needed by a node to discover all its neighbors. As implementation options, the discovery procedure may be terminated after a fixed number of rounds or if the number of responding nodes during the last round is smaller than a certain value.

2. Specific Embodiments

Embodiments of FIG. 4 and FIG. 5 differ essentially in the ordering of the ND procedure vs. the LP procedure. In FIG. 4: both procedures are intertwined, while in FIG. 5 the ND procedure is completed before triggering the LP procedure. The embodiment of FIG. 5 is discussed in details first.

2.1 Consecutive ND and LP Procedures

In the following, specific embodiments of methods and systems for enabling network discovery are described in reference to FIGS. 5-10. Here, the LP procedure (steps S15-S17) is implemented at a current node 20 once all nodes have been discovered, as seen from FIG. 5. This scenario is more "deterministic" than that of FIG. 4 inasmuch as the time necessary to complete the ND procedure (shorter) is easily determined and not perturbed by (longer) LP procedures. In more details, the LP procedure essentially has a deterministic duration, while ND has not (i.e., in the beginning, it is not known how many nodes there are). An advantage is that the typically short ND core steps S22-S23 can be repeated (S24) until all known nodes are found (should it be necessary), without substantial consequences on the duration. On the contrary, the longer LP procedure is carried out only once.

Typically, BS 10 selects a current node 20 (step S11) amongst nodes not processed yet and instructs the selected node 20 to start the ND procedure first, step S12. In short, the BS sends a command ND-CMD to node 20, e.g., using source routing. Node 20 reacts by broadcasting the ND request onto the medium 1. Upon reception of the ND request, step S31, a neighbor node 30 processes the request (step S33) and replies an appropriate response ND_RESP (step S34), thereby identifying itself to node 20. The response is received at step S23 at node 20, which accordingly reports to BS, step S25, using reverse source routing.

Figure 6:
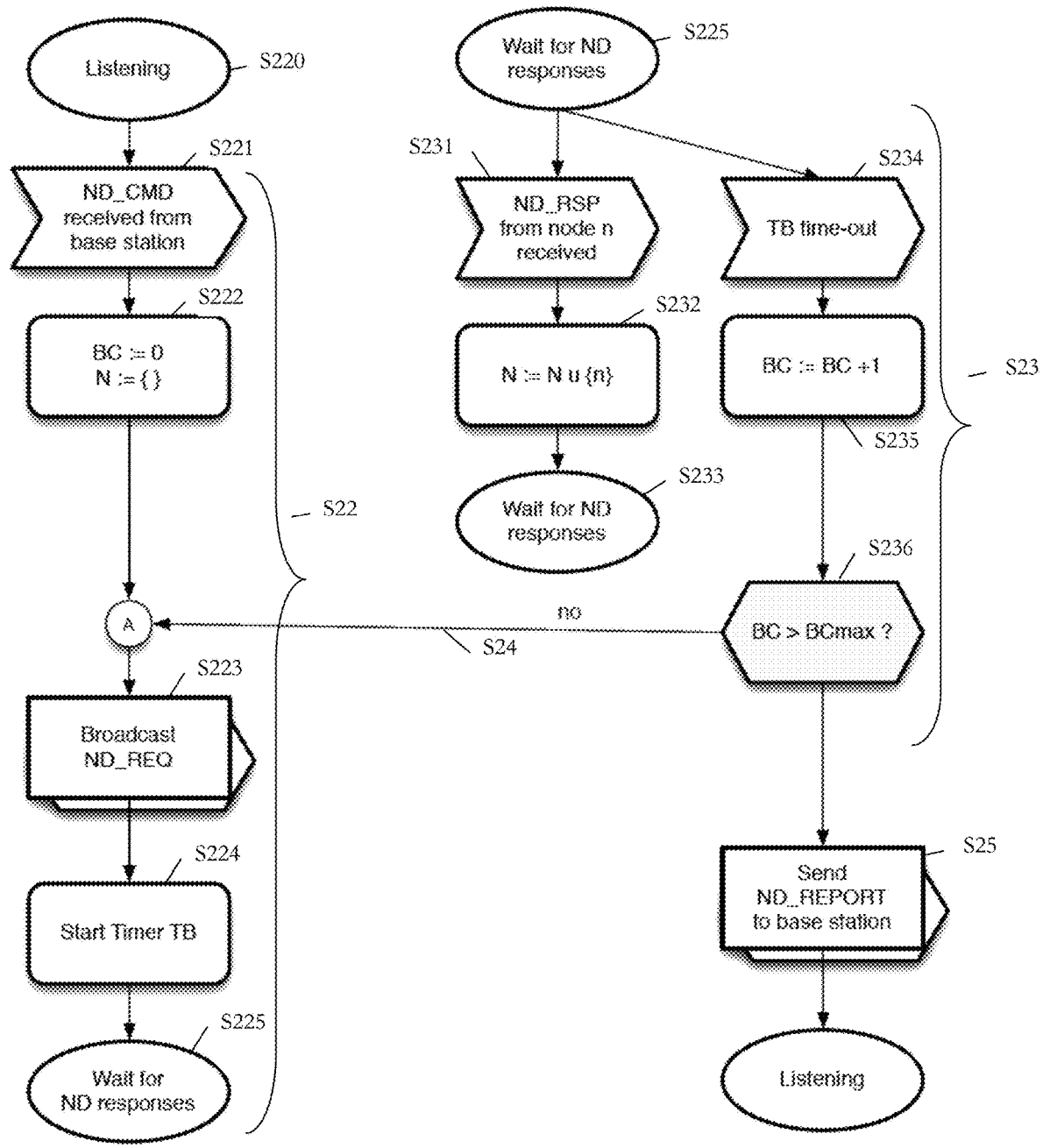
FIGS. 6-10 decompose some of the steps of FIG. 5 into detailed sub-steps, as involved in embodiments.
Figure 7:
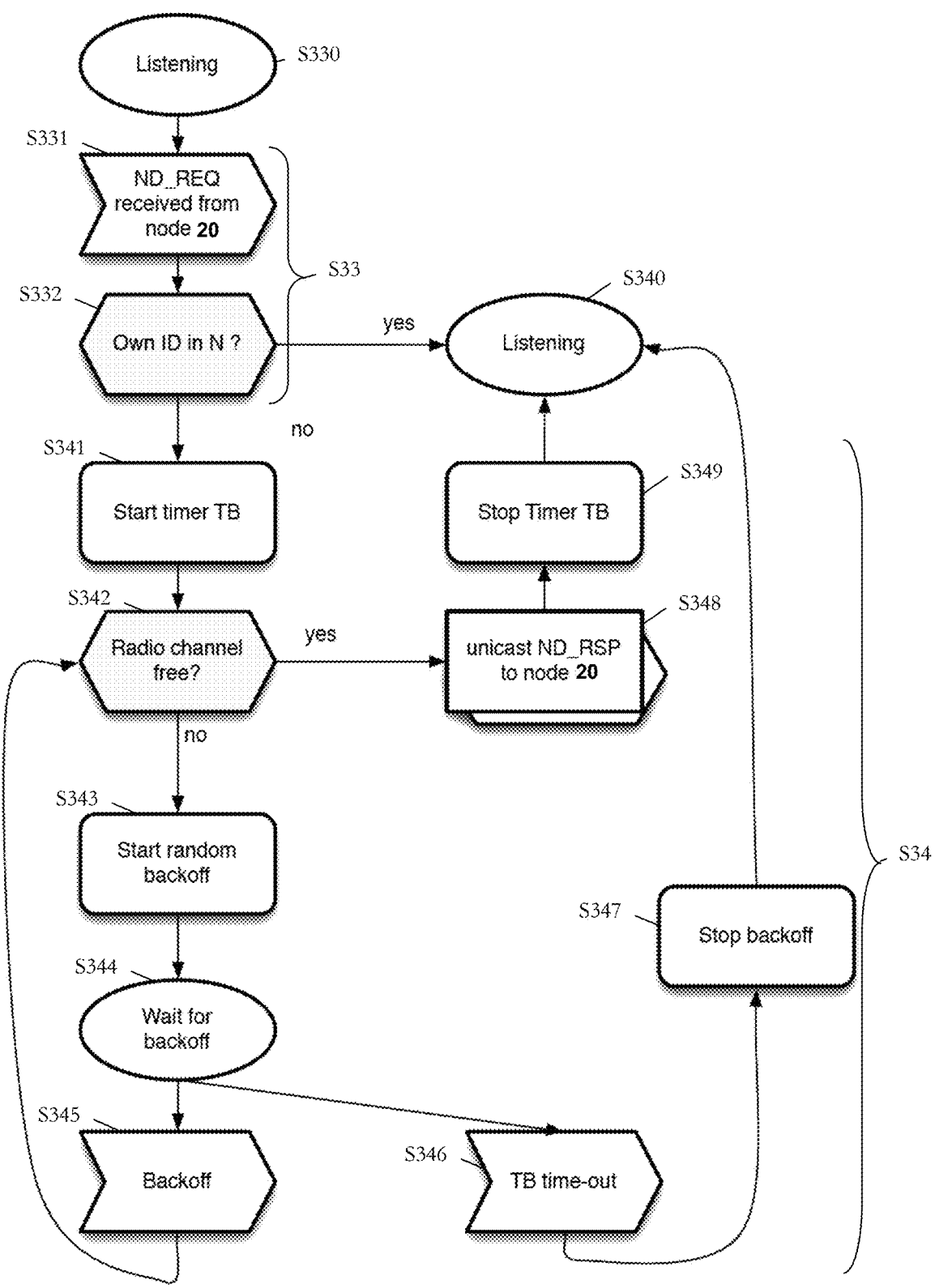

The above steps can furthermore decompose into several sub-steps, which are now described in reference to FIG. 6 (describing steps performed at a node 20 currently selected) and FIG. 7 (relating to a neighbor node).

In reference to FIG. 6, the following scheme can be implemented:

Step S220: node 20 is listening (it is not aware that it has been selected by the BS yet);

Step S221: it receives a ND command (ND_CMD) from the BS;

Step S222: node 20 initializes counter BC to zero as well as the set N of replying node;

Step S223: node 20 broadcasts the ND request and

Step S224: starts a timer TB;

Step S225: node 20 returns to listening mode, awaiting possible responses.

As it can be realized, steps 221-225 above merely correspond to step S22 of FIG. 5. More generally, any suitable scheme which more generally consist of receiving the ND command and broadcasting the ND request can be contemplated.

Similarly, step S23 of FIG. 5 may decomposes, see FIG. 6, into:

Step S231: when a response ND_RESP is received at node 20 from a particular node n among neighbor nodes 30, Step S232: node 20 updates the set N according to replier n (a suitable identifier for node n is added to N);

Step S233: node 20 returns to listening mode, awaiting further responses;

Step S234: On the other hand, if the timer TB previously set has expired, then;

Step S235: node 20 increments BC; and

Step S236: checks whether a maximum counter value has been reached. If not, ND_REQ shall be re-broadcasted, step S223. Node 20 accordingly re-transmit ND_REQ a few times, as depicted in FIG. 5, step S24. Thus, the replies received when implementing a ND procedure for selected node 20 are taken in consideration during a limited time only. If the maximum counter value has been reached, then node 20 prepares and sends a report (ND_REPORT) to BS, step S25. Node 20 finally returns to listening mode.

Meanwhile, the following scheme can be implemented at the neighbor nodes 30. Let consider a particular node (say node n) amongst neighbor nodes 30:

Step S330: the node is listening;

Step S33 (also in FIG. 5), decomposes into:

Step S331: ND_REQ is received from node 20. As said, the ND request comprises information as to whether a neighbor node should reply or not. Typically, said information consists of identifiers (IDs) of nodes which have already replied;

Step S332: node n accordingly checks whether the ND request contains its own ID. If yes, node 30 returns to listening mode, step S340. If not, node n will reply by sending a ND response, step S34, see also FIG. 5. As said earlier, this response is typically unicasted using a CSMA-like protocol, i.e., the response is sent in absence of other traffic.

Step S34: accordingly, the response procedure may decompose into:

Step S341: a timer is started;

Step S342: node n checks whether the medium (e.g., a radio channel) is free;

Step S343: if not, node n starts a random backoff;

Step S344: node waits that the random backoff expires;

Step S345: when the backoff expires, node n goes back to step S342 to check whether the medium is free;

Step S346: on the other hand, if the timer set at step S341 expires,

Step S347: then node n stops the backoff and returns to listening mode, step S340;

Step S348: now, if the medium is free, as checked at step S342, then node n may proceed to unicast the response to the requesting node 20, Step S349: the timer set at step S341 is thus stopped and node n returns to listening mode, step S340.

Based on the report ND_REPORT received from node 20, the BS can now determine which nodes 30 are still to be processed (step S13). The ND procedure is accordingly re-iterated, step S14, until all nodes have been discovered.

Next, upon completion of the ND process, the BS 10 is aware of a set of nodes that have responded and can start the LP procedure. Even, the BS has a list of nodes which includes for each node the list of its neighbors and the source routes that can be used to send a message to said each node. Based on that information, the BS requests every distinct node on the list to perform a link probing procedure, the details of which are described below. The link probe procedure is terminated when all nodes in the list have performed the link probing procedure and the results transferred to the base station. Link qualities are then accumulated at the BS based on the collected statistics.

To implement the LP procedure, the BS shall first select (FIG. 5, step S15) a node (which is again denoted by reference numeral 20) and instruct the selected node 20 to locally start a LP procedure. Namely, the BS sends a command LP_CMD to node 20, step S16.

Figure 8:
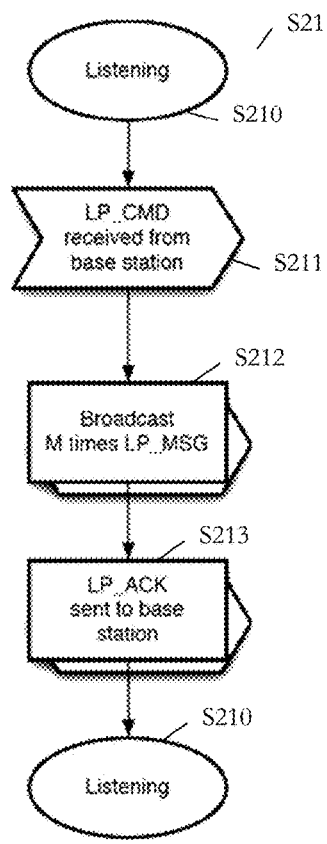

Broadly, the selected node 20 reacts by broadcasting one or more link probing messages LP_MSG (FIG. 5, step S21). More in details, and as illustrated in FIG. 8, node 20 performs the following steps:

Step S220: node 20 listens to the network;

Step S221: it receives the LP command sent from the base station;

Step S222: in turn, it broadcast M times a link probing message LP_MSG;

Step S223: it acknowledges accordingly to BS (LP_ACK sent, as also indicated in step S21) and returns to listening mode. The BS may send continue (step S17) with other nodes 20 (and re-iterate steps S15, S16, etc.).

Figure 9:
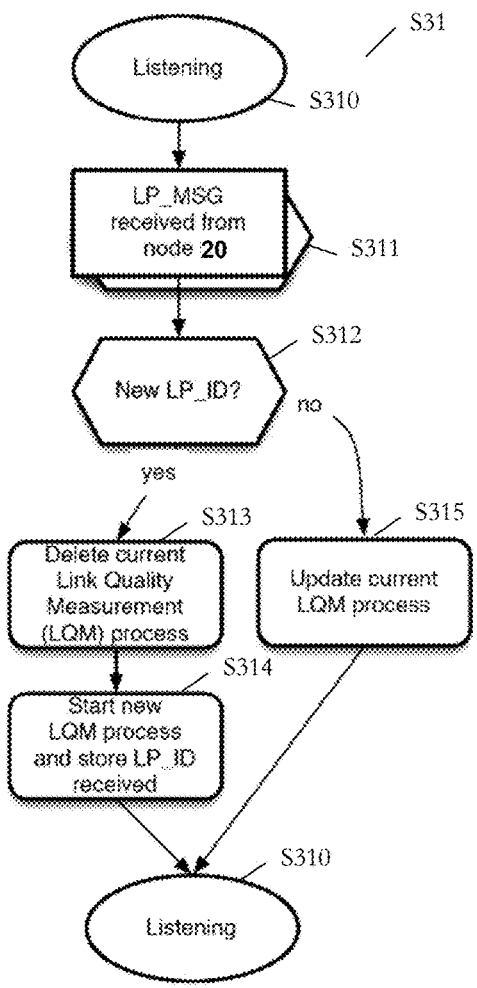
Figure 10:
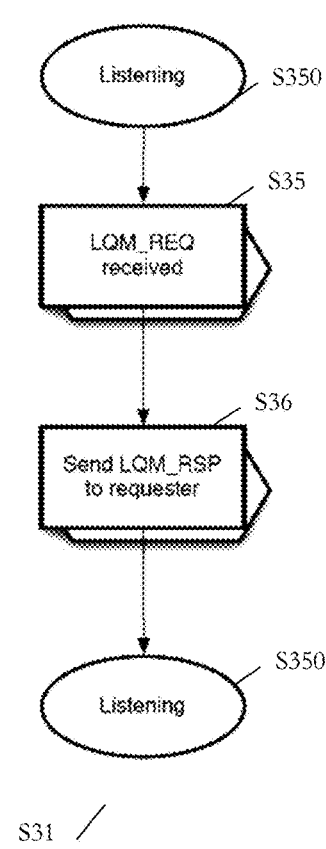

Correspondingly, a neighbor node n (amongst neighbor nodes 30) may proceed according to FIG. 9, namely:

Step S310: node n is listening;

Step S311: a LP message LP_MSG is received from node 20;

Step S312: node n checks the ID of the corresponding link probing message train (LP_ID), i.e., to check whether a link quality measurement is already running for the message train to which the message LP_MSG just received belongs. In addition, LP_MSG comprises the ID of the sending node;

Step S313: if the ID of the link probing message train is new, node n deletes a current LQM process running and Step S314: starts a new LQM process;

Step S315: if the ID of the LP message train is not new (meaning a LQM process is already running for that LP message train), node n instruct to update the current LQM process running.

The results of an LMQ process can be requested by any node. Preferably, the BS will collect LQM results, as depicted in FIG. 5. A command is accordingly sent from the BS, step S18, received at a node n, step S35, the results (LQM_RSP) are then sent back to requester, step S36, for subsequent processing thereat, step S19. How this is managed from the node n recipient viewpoint is otherwise briefly outlined in FIG. 10. First, node n is listening, step S350. Then, a LMQ_REQ (sent either by any node 20 or by the BS) is received, step S35. Then, the results of the relevant LMQ process can be packed into a corresponding response LMQ_RSP and sent to the requester, step S36.

Finally, once all LQM results are known, proper communication may start, e.g., using TDMA (not shown).

2.2 Interlaced ND and LP Procedures

In the following, embodiments for enabling network discovery are described more specifically in reference to FIG. 4. As evoked earlier, the LP and ND procedures are now intertwined. As we shall see, interlacing steps of LP and ND procedures allows for saving some steps and might be more efficient in some cases.

More precisely, and as illustrated in FIG. 4, the LP procedure interlaces with the ND, such that a reply received at a node 20 (currently selected) in response to a ND request comprises data related to a measure of link quality between the current node 20 and the replying node n (step S23). In other words, LP is initiated prior to ND in that case, such that data related to a link quality measure (LQM) are available when the ND request arrives. Such results can accordingly be added in response to a ND request, such that the ND responses and LQM results are collected altogether.

More specifically, in that case, the BS 10 would typically instruct a selected node 20 to start both LP and ND procedures, see FIG. 4. Namely, the BS sends a dedicated command, call it LP/ND_CMD to node 20, e.g., using source routing. In variants, BS first sends a LP_CMD and, later, upon acknowledgement of node 20, sends a ND-CMD.

Next, the selected node 20 reacts by sending said one or more link probing messages LP_MSG, e.g., by broadcasting said messages. The selected node 20 may further acknowledge receipt of LP_CMD if needed.

Upon reception, step S31, a given neighbor node n amongst neighbors 30 proceeds to the LQM and stores the results for later use. Other neighbor nodes shall actually proceed essentially the same way vis-à-vis the broadcasting node 20 or other nodes later selected by the BS.

Later on (e.g., after expiration of a timer or upon instruction from the BS), when the node 20 broadcasts the ND request (ND_REQ, step S22), the same neighbor node n may process the ND request, step S33, and reply by sending a corresponding response (ND_RESP), adjoining the results of the LQM, step S34. Accordingly, a joint response of the neighbor node 30 would likely comprise both the response to the ND request and LQM results for the relevant link, whereby one retransmission step is saved.

The joint response is received at the current node 20, step S23. The step of broadcasting the ND request is typically repeated (step S24), to ensure safe receipt by all neighbors.

Next, the current node 20 can report to the BS 10, step S25, which nodes have replied and thereby been identified, for subsequent processing at the BS. In addition, LQM results are passed to the BS.

The BS accordingly determines which new nodes still need 'to be processed', i.e., these nodes for which implementing the LP/ND procedure may lead to still further nodes, not identified so far.

The BS accordingly iterates through all nodes until all nodes are processed, step S14. Finally, once all nodes are identified and LQM results known, proper communication may be implemented between the nodes, e.g., using a time multiplexing scheme such as time division multiple access (TDMA, not shown). No time multiplexing was involved so far as nodes did not know about each other.

Next, as a possible variant, one may contemplate merging the ND and LP broadcasting steps (steps S21 and S22). Namely, the link probing messages could act as neighbor discovery requests and steps S21 and S22 be one and a same step. Yet, that would likely extend the duration of the whole procedure, as the LP procedure typically broadcasts a rather large number of messages while the ND procedure requires sending only one message, which is re-broadcasted a few times, e.g., 1-3 times.

3. Node Description

Preferably, sensor nodes are considered. Sensor nodes (or motes), are configured to gather sensory information, perform some (limited) processing and communicate with other connected nodes in the network. As evoked earlier, the BS is typically configured to perform more complex tasks. It can be regarded as a supernode, having more computational and memory capabilities. In all cases, the nodes and the BS can each be regarded as a computerized unit, such as depicted in FIG. 3.

As known, the main components of a sensor node are typically:
a microcontroller, comprising:
  a processor core,
  memory,
  programs, and
  programmable input/output peripherals such as timers, event counters, etc.

The microcontroller processes data (performs simple tasks) and controls other components in the node, which are generally:
  a transceiver (or more generally a network interface) to interact with the network,
  an external memory or storage,
  a power source; and
  one or more sensors interfaced through input controller.

The nodes and the BS are designed for implementing aspects of the present invention described above. In that respect, it will be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by special digital computers (nodes and BS). More generally, embodiments of the present invention can be implemented using general-purpose digital computers, such as personal computers, workstations, etc.

The system 100 depicted in FIG. 3 schematically represents a computerized unit 101, e.g., a general-purpose computer that can play the role of a sensor node or a BS. In exemplary embodiments, in terms of hardware architecture, as shown in FIG. 3, the unit 101 includes a processor 105, memory 110 coupled to a memory controller 115, and one or more input and/or output (I/O) devices 140, 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 3, the software in the memory 110 includes methods described herein in accordance with exemplary embodiments and a suitable operating system (OS) 111. The OS 111 essentially controls the execution of other computer programs, such as the methods as described herein (e.g., FIGS. 4-10), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135 (in particular for the BS, if needed). Other I/O devices 140-155 may include sensors (especially in the case of nodes), i.e., hardware devices that produce a measurable response to a change in a physical condition like temperature or pressure (physical data to be monitored). Typically, the analog signal produced by the sensors is digitized by an analog-to-digital converter and sent to controllers 135 for further processing. Sensor nodes are ideally small, consume low energy, are autonomous and operate unattended. As wireless sensor nodes are typically small electronic devices, they are preferably equipped with a limited power source, e.g., less than 0.5-2 ampere-hour and 1.2-3.7 volts.

In addition, the I/O devices 140-155 may further include devices that communicate both inputs and outputs. The system 100 can further include a display controller 125 coupled to a display 130. In exemplary embodiments, the system 100 can further include a network interface or transceiver 160 for coupling to a network 165.

The network 165 transmits and receives data between the unit 101 and external systems (nodes/BS). As said, the network 165 is preferably implemented in a wireless fashion, e.g., using wireless protocols and technologies. Present embodiments preferably focus on low powered networks, e.g. IEEE 802.15.4. Yet, other embodiments can be contemplated which use other protocols and technologies. There are many such technologies (e.g., fixed wireless network, wireless local area network (LAN), wireless wide area network (WAN), etc.), they are known per se and do not need to be further described here. The network 165 can also be a packet-switched network such as a local area network, wide area network, Internet network, or other type of network environment.

If the unit 101 is a PC, workstation, intelligent device or the like, the software in the memory 110 may further include a basic input output system (BIOS) (omitted for simplicity). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed.

When the systems and methods described herein are implemented in software, the methods can be stored on any computer readable medium, such as storage 120, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 101 (node or BS), partly thereon, partly on a unit 101 and another unit 101, similar or not. It may execute partly on a user's computer and partly on a remote computer or entirely on the remote computer or server.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiment disclosed, but that the present invention will include all embodiments falling within the scope of the appended claims. For example, many modification to the CSMA protocol may be used for unicasting responses to requesting nodes, e.g., carrier sense multiple access with collision detection (CSMA/CD) or carrier sense multiple access with collision avoidance (CSMA/CA), etc., in embodiments. In some places, unicasting processes can replace broadcasting processes and reciprocally, where appropriate, depending on the applications. Some typical BS tasks can be delegated to nodes, e.g., adding (step S13) replying neighbor nodes to the group of nodes to be processed, etc.

What is claimed is:

1. A method of discovery of a set of computer nodes in a computer network, comprising the steps of:
    (a) selecting from a source computer node a computer node amongst a group of computer nodes on the computer network;
    (b) implementing, from the source computer node, a discovery procedure for the selected computer node, said discovery procedure comprising:
    (c) broadcasting a neighbor discovery request from a computer node currently selected on a shared transmission medium of the computer network;
    (d) receiving, at the computer node currently selected, replies sent by neighbor computer nodes on the shared transmission medium and adding said neighbor computer nodes to a set of discovered computer nodes;
    (e) repeating steps (a) and (b) for other selected computer nodes in the group of computer nodes to be processed until the discovery procedure for all the computer nodes of the group of computer nodes has been implemented, such that the set of discovered computer nodes includes all the neighbor computer nodes that sent replies; and
    (f) after the discovery procedure for all the computer nodes of the group of computer nodes has been completed, implementing a link probing procedure for each computer node of the group of computer nodes and for each computer node of the set of discovered computer nodes, said link probing procedure including sending a plurality of link probing messages for a measure of link quality from each selected computer node to the set of discovered computer nodes and each selected computer node receiving a plurality of replies comprising data related to the measure of link quality from the set of discovered computer nodes.

2. The method of claim 1, wherein instructing comprises instructing to implement the discovery procedure for the selected computer node via a source routing mechanism.

3. The method of claim 1, wherein sending the plurality of link probing messages includes sending the plurality of link probing messages from a computer node currently selected to neighbor computer nodes for subsequent measure of link quality.

4. The method of claim 3, wherein the sending the plurality of link probing messages comprises broadcasting the plurality of link probing messages on the shared transmission.

5. The method of claim 1, wherein the discovery procedure for the selected computer node is implemented by a source routing mechanism based on source routing information of the selected node previously discovered.

6. The method of claim 5, wherein the source routing information is updated after each node selection in step (e), and wherein in step (d) the replies are sent by neighbor computer nodes to the computer node currently selected via the source routing mechanism.

7. The method of claim 1, wherein the replies received when implementing the discovery procedure for a selected computer node were unicasted by neighbor computer nodes.

8. The method of claim 7, wherein the replies received when implementing a discovery procedure for a selected computer node were unicasted by neighbor computer nodes using a CSMA protocol, whereby each of said replies was sent in absence of other traffic on the shared medium.

9. A computer program residing on a non-transitory computer-readable medium, comprising instructions for causing computer nodes of a computer network to implement the steps of:
(a) selecting from a source computer node a computer node amongst a group of computer nodes on the computer network;
(b) implementing, from the source computer node, a discovery procedure for the selected computer node, said discovery procedure comprising:
(c) broadcasting a neighbor discovery request from a computer node currently selected on a shared transmission medium of the computer network;
(d) receiving, at the computer node currently selected, replies sent by neighbor computer nodes on the shared transmission medium and adding said neighbor computer nodes to a set of discovered computer nodes;
(e) repeating steps (a) and (b) for other selected computer nodes in the group of computer nodes to be processed until the discovery procedure for all the computer nodes of the group of computer nodes has been implemented, such that the set of discovered computer nodes includes all the neighbor computer nodes that sent replies; and
(f) after the discovery procedure for all the computer nodes of the group of computer nodes has been completed, implementing a link probing procedure for each computer node of the group of computer nodes and for each computer node of the set of discovered computer nodes, said link probing procedure including sending a plurality of link probing messages for a measure of link quality from each selected computer node to the set of discovered computer nodes and each selected computer node receiving a plurality of replies comprising data related to the measure of link quality from the set of discovered computer nodes.

10. The method of claim 9, wherein instructing comprises instructing to implement the discovery procedure for the selected computer node via a source routing mechanism.

11. The method of claim 9, wherein sending the plurality of link probing messages includes sending the plurality of link probing messages from a computer node currently selected to neighbor computer nodes for subsequent measure of link quality.

12. The method of claim 11, wherein the sending the plurality of link probing messages comprises broadcasting the plurality of link probing messages on the shared transmission.

13. The method of claim 12, wherein the discovery procedure for the selected computer node is implemented by a source routing mechanism based on source routing information of the selected node previously discovered.

14. The method of claim 13, wherein the source routing information is updated after each node selection in step (e), and wherein in step (d) the replies are sent by neighbor computer nodes to the computer node currently selected via the source routing mechanism.

15. The method of claim 9, wherein the replies received when implementing the discovery procedure for a selected computer node were unicasted by neighbor computer nodes and wherein the replies received when implementing a discovery procedure for a selected computer node were unicasted by neighbor computer nodes using a CSMA protocol, whereby each of said replies was sent in absence of other traffic on the shared medium.

16. A computerized network comprising computer nodes, each with at least one processor comprising hardware operatively interconnected to a memory, whereby the computerized network is configured to implement the steps of:
(a) selecting from a source computer node a computer node amongst a group of computer nodes on the computer network;
(b) implementing, from the source computer node, a discovery procedure for the selected computer node, said discovery procedure comprising:
(c) broadcasting a neighbor discovery request from a computer node currently selected on a shared transmission medium of the computer network;
(d) receiving, at the computer node currently selected, replies sent by neighbor computer nodes on the shared transmission medium and adding said neighbor computer nodes to a set of discovered computer nodes;
(e) repeating steps (a) and (b) for other selected computer nodes in the group of computer nodes to be processed until the discovery procedure for all the computer nodes of the group of computer nodes has been implemented, such that the set of discovered computer nodes includes all the neighbor computer nodes that sent replies; and
(f) after the discovery procedure for all the computer nodes of the group of computer nodes has been completed, implementing a link probing procedure for each computer node of the group of computer nodes and for each computer node of the set of discovered computer nodes, said link probing procedure including sending a plurality of link probing messages for a measure of link quality from each selected computer node to the set of discovered computer nodes and each selected computer node receiving a plurality of replies comprising data related to the measure of link quality from the set of discovered computer nodes.

17. The method of claim 16, wherein instructing comprises instructing to implement the discovery procedure for the selected computer node via a source routing mechanism.

18. The method of claim 16, wherein sending the plurality of link probing messages includes sending the plurality of link probing messages from a computer node currently selected to neighbor computer nodes for subsequent measure of link quality.

19. The method of claim 18, wherein the sending the plurality of link probing messages comprises broadcasting the plurality of link probing messages on the shared transmission.

20. The method of claim 16, wherein the discovery procedure for the selected computer node is implemented by a source routing mechanism based on source routing information of the selected node previously discovered and wherein the source routing information is updated after each node selection in step (e), and wherein in step (d) the replies are sent by neighbor computer nodes to the computer node currently selected via the source routing mechanism.

* * * * *